INVENTOR
KATSUYA ATSUMI
BY KARL RATH
ATTORNEY

INVENTOR
KATSUYA ATSUMI
BY
KARL RATH
ATTORNEY

United States Patent Office 3,439,126

Patented Apr. 15, 1969

3,439,126

RECORDING AND BIASING HEAD ASSEMBLY FOR MAGNETIC TAPE RECORDERS

Katsuya Atsumi, Tokyo, Japan, assignor to Akai Electric Company, Limited, Tokyo, Japan Continuation of application Ser. No. 178,678, Mar. 9, 1962. This application May 6, 1966, Ser. No. 548,202
Int. Cl. G11b 5/48
U.S. Cl. 179—100.2 7 Claims This application is a continuation of application Serial No. 178,678, filed March 9, 1962, now abandoned, entitled Magnetic Head Assembly in Magnetic Tape Recorder.

The present invention relates to magnetic tape recorders more particularly to an improved magnetic recording and high frequency biasing head assembly for recorders of this type.

Tape recorders of the type comprising a signal recording and magnetic biasing winding upon a common magnetic head or core are well known. They have the disadvantage, among others, that the relative recording and biasing magnetic fields can be controlled with difficulty only. For this reason, it has become known to provide physically separate recording and biasing heads or magnets, to enable the establishment of a desired relationship between the recording and biasing fields, as well as between the tape and said fields, respectively, in an effort to improve the performance, or quality of the records obtained.

It is furthermore known, in utilizing the high frequency biasing technique adopted generally at present for reasons well known, that the higher the signal frequency to be recorded the greater will be the difficulty encountered as a result of the so-called high frequency fall-off, or weakening of the high frequency components of the signals being recorded, due to the fact that the higher frequency components recorded upon the tape are subjected to the influence of the so-called trailing high frequency magnetic biasing field, whereby to be weakened or suppressed by the erasing effect of said field. As a consequence, the currently available tape recorders are limited practically in their frequency response to a maximum recroding frequency of the order of about 10,000 cycles per second.

Various attempts have been made in the past to solve the problem resulting from the high frequency fall-off, to improve the performance and to extend the usefulness of magnetic tape recorders utilizing a high frequency biasing technique. One such solution is predicated on an asymmetrical design of the path of the tape, to produce an abrupt change in the trailing magnetic field following the recording gap as viewed in the travelling direction of the tape. Such a solution has, however, been found difficult, if not impractical, for obvious reasons, as have similar attempts, such for instance as the provision of auxiliary shielding poles or screening means, to weaken or suppress the effect of the trailing field on the tape, to solve the problem of the high frequency fall-off in magnetic tape recorders.

Accordingly, an important object of the present invention is the provision of an improved and simplified recording and high frequency biasing head assembly for magnetic tape recorders of the referred to type by which signal frequencies of the order of 10,000–80,000 cycles per second and beyond may be recorded faithfully and substantially without any high frequency fall-off.

A more specific object of the invention is to render substantially ineffective the trailing magnetic biasing field in erasing or weakening the high frequency signal components in tape recorders of the type referred to.

According to prevailing trends in the development of magnetic tape recorders, considerable efforts are being made to decrease the running speed of the tape without sacrificing recording quality, one advantage of the reduced tape speed being a greater recording capacity for a tape of given length. By rendering the trailing magnetic biasing field ineffective as proposed by the present invention, the tape speed of a given recorder may be reduced in a most simple manner to about one half or less without impairing recording performance or quality.

Another object of the invention is, therefore, the provision of simple and efficient means in a tape recorder of the referred to type to enable a reduction of the tape speed substantially without impairing the high frequency response of the recorder.

Experiments conducted by applicant to overcome the effects of high frequency fall-off of conventional magnetic tape recorders utilizing a high frequency biasing field have shown the advantage of providing separate recording and high frequency biasing heads or magnets spaced from one another by a predetermined distance. Essentially, the present invention involves the provision of recording and biasing heads arranged with their spaced gaps shifted laterally relative to one another and offset or inclined angularly to an extent, to substantially reduce the effect of the trailing magnetic biasing field on the tape.

Since the tape must be subjected to the full magnetizing effect of the leading portion of the biasing field, or field ahead of the biasing gap, and since furthermore the gap of the recording magnet should have a width as small as possible for recording the highest possible signal frequencies, it follows that the gap of the biasing head will be substantially wider than the recording gap, the ratio of the gap widths varying in practice within a range from 2–500. This and the further fact that the biasing frequency must be a substantial multiple of the highest signal frequency to be recorded results in a trailing biasing field following the recording gap of substantial length and resultant high frequency fall-off of the signals being recorded.

It has furthermore been found by applicant that the tape should be led out of the trailing region of the biasing field along the shortest possible path by provision of suitable tape guide means. The latter may comprise part of the contour of the recording head in combination with a suitable number of guide rollers. Provision must also be made to separate the heads from one another during playback operation of the recorder, for the reason that, although the biasing winding may be electrically disconnected during playback, disturbing voltages may be induced in the playback circuit if the heads are at too close a spacing from one another. This separating means may comprise a retractible member supporting the biasing head and mounted for uni-control by the usual record-playback control knob or the like control member of the recorder.

The distance between the heads during recording may normally be between 0.1 and 1.0 millimeter, although these values are apt to vary, depending upon such other parameters as ampere turns of the biasing head, the type of tape used, etc. The movable member, in the form of a pivot plate or the like, carrying the biasing head is advantageously fitted with means, such as a spring-loaded adjusting stop, to maintain a preselected spacing distance between the heads.

In order to establish an optimum offset or relative angular position of the heads, the biasing head is furthermore provided with suitable fine adjusting means, to effect a control of the relative lateral displacement and offset angle of the heads.

The invention, both as to the foregoing as well as ancillary objects, advantages and novel features thereof will become more apparent from the following detailed description, taken in conjunction with the accompanying drawings forming part of this specification and in which.

Figure 3:
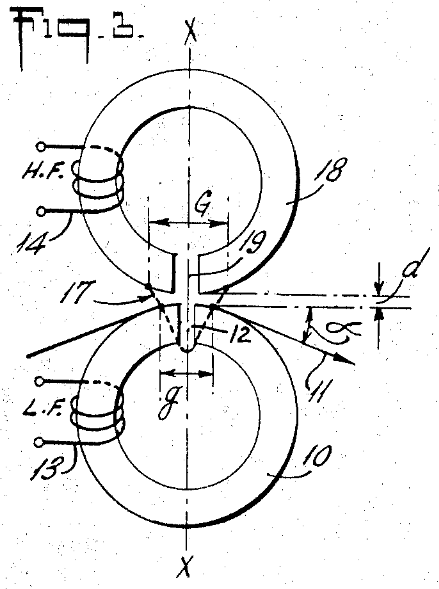
FIG. 3 shows a recording and biasing head assembly embodying separate recording and biasing heads.
Figure 4:
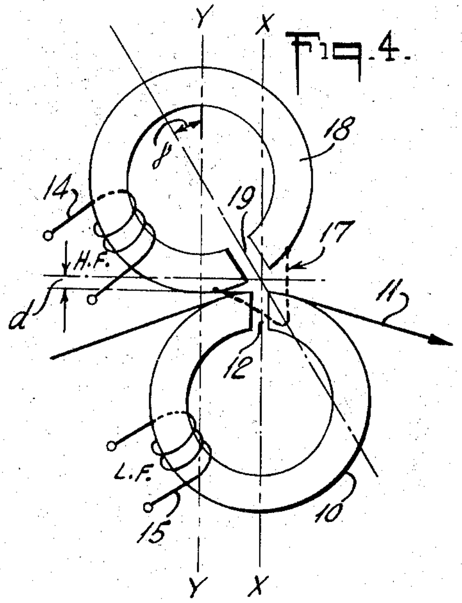
Figure 5:
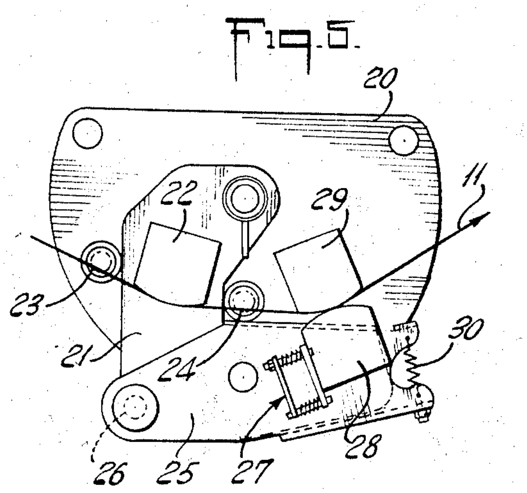
Figure 6:
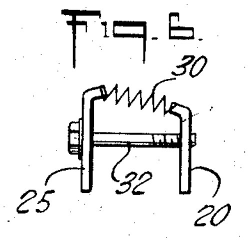
Figure 7:
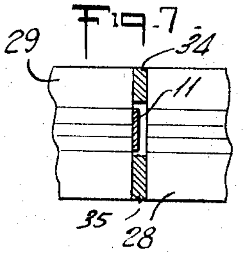
Figure 8:
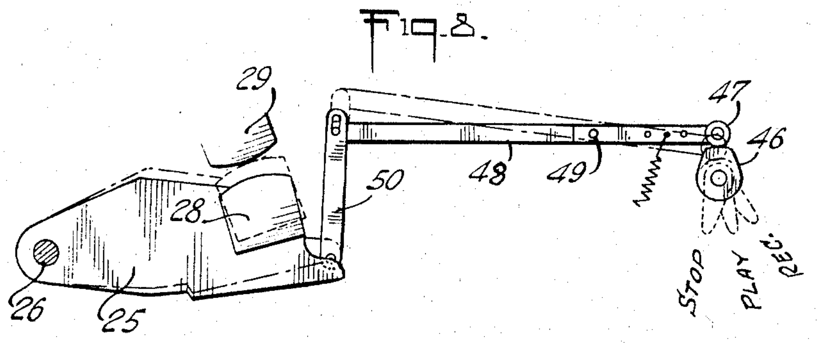
Figure 9:
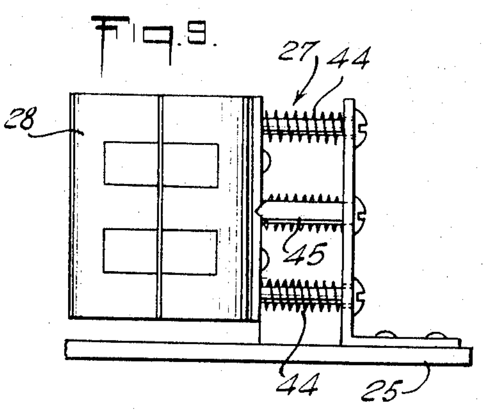
Figure 10:
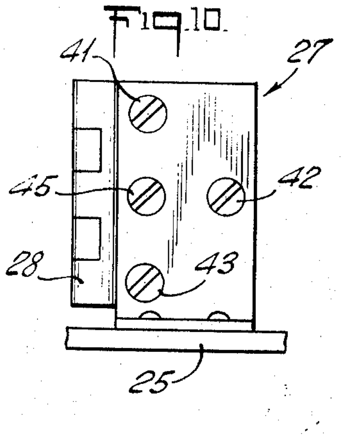

FIG. 4, being similar to FIG. 3, illustrates the improved recording and biasing head arrangement according to the invention;

FIG. 5 is a plan view of a practical recording and biasing head construction embodying the principles of the invention;

FIG. 6 is a detail view, to an enlarged scale, of the spacing control mechanism of the heads of FIG. 5;

FIG. 7 is a fragmentary view of an alternative spacing control means for the heads of FIG. 5;

FIG. 8 is a diagrammatic view of the control for the separation of the heads in the inoperative and playback positions;

FIG. 9 is a fragmentary front view of the lateral and offset angle adjusting mechanism for the heads of FIG. 5; and FIG. 10 is a top view of FIG. 9.

Like reference numerals denote like parts in the different views of the drawings.

Figure 1:
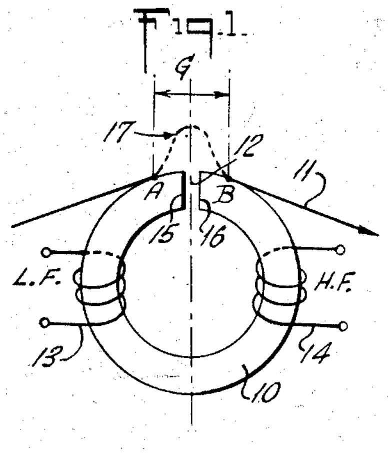
FIG. 1 shows schematically a conventional magnetic recording and high frequency biasing head having biasing and recording windings mounted upon a common magnet core.
Figure 2:
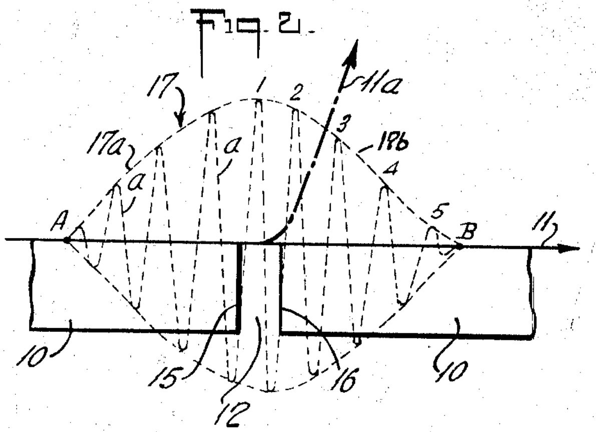
FIG. 2 is an enlarged fragmentary view of FIG. 1 with the poles of the magnetic gap shown in straight instead of curved configuration and including theoretical curves indicative of the biasing magnetic field distribution and explanatory of the function and operation of the invention.

Referring more particularly to FIGS. 1 and 2, the numeral 10 denotes a magnet head in the form of a closed magnet core, 11 represents a magnetic recording tape with the arrow indicating the travelling direction of the tape, while 12 denotes the magnetic biasing gap formed in the head 10 and across which is passed the tape 11, 13 is the low frequency (L.F.) or signal recording winding and 14 is the high frequency (H.F.) or biasing winding, whereby to result, upon energization of the magnet by a suitable high frequency current, in a biasing magnetic field distribution curve 17 having a peak value in registry with the center of the gap 12 or intermediate the leading magnetic pole 15 and the trailing magnetic pole 16 on the opposite sides of said gap. For a better understanding of the effects of the present invention, the field 17 is divided into two regions, viz a leading region 17*a* (see also FIG. 2) ahead of the gap 12 and a trailing region 17*b* following said gap, respectively. The configuration of the field 17 resembles the well-known resonance curve with the ordinates or side branches including a gradually decreasing angle with the surface of the head or tape 11 as abscissa.

In the utilization of high frequency biasing of this type, the recorded signals are more or less, subjected to undesirable erasure by the action of the trailing high frequency field 17*b* composed of magnetic flux alternations *a* of gradually decreasing amplitude, as indicated at 1–5 in FIG. 2. This effect is predominant upon the recorded higher frequency signals or components and known as high frequency fall-off in tape recorders of this type. The greater the effective length G, FIG. 1, between the opposite extremities A and B of the branches of the field 17, the more pronounced will be the erasing or fall-off effect on the high frequency signal components.

Referring more particularly to FIG. 2 and assuming a given minimum width of the gap 12, as the tape speed is increased in an effort to increase the maximum recordable frequency, the biasing frequency must be increased accordingly, whereby to reach a limit of the effect of the biasing field 17 on the tape 11 assuming the form of increasing (within the leading field portion 17*a*) and decreasing (within the trailing field portion 17*b*) flux alternations *a*. The trailing alternations indicated at 1–5 constitute a high frequency erasing field for the signals recorded upon the tape upon passing the gap 12. The effect of the trailing erasing field alternations on the relatively strong fundamental and low frequency signal components is negligible, while the effect on the relatively weaker high frequency components of the signal may become substantial in causing a high-frequency fall-off referred to hereinabove. In other words, a given point of the tape will be subjected to the action of the magnetic flux alternations *a* of increasing amplitudes within the leading region of the field, that is, ahead of the gap 12, while the same point will be subjected to magnetic flux variations of decreasing amplitudes within the trailing field region, or after passing the gap 12.

As can furthermore be seen, the number of flux variations (five being shown in the drawing) increases as the signal frequency and in turn the biasing frequency increases, that is, the erasure or fall-off effect is increased accordingly, it being well known that erasure of a magnetic record is predicated on the number and gradual decrease of the amplitude of the erasing flux alternations acting upon the sensitive layer of the tape.

A possible solution of the problem of high frequency fall-off consists in minimizing the number of the trailing flux alternations acting upon the tape by so guiding the tape as to make an abrupt change in its path upon leaving the gap 12, as indicated at 11*a* in FIG. 2. In this manner, the performance of the recorder can be improved in that the number of trailing flux alternations may be reduced to about two, to thereby suppress the erasing effect. In practice, great difficulties are, however, encountered in the design and operation of a head assembly of this type due to the abrupt bent of the tape path, as well as for other reasons well known. There is provided, therefore, by the present invention a more simple and efficient solution of the problem of high frequency fall-off in tape recorders, in the manner pointed out and described in greater detail in the following in reference to FIGS. 3 and 4.

Referring to FIG. 3, the biasing head 10 according to the invention is positioned oppositely to and at a predetermined distance *d* from a separate recording head 18 with the gaps 12 and 19 of the heads being in line with one another, or having a common axis *x*—*x*, and with the distance *d* between the heads being in excess of the necessary minimum distance required for the mounting and guidance of the tape. Assuming a given recording and biasing head assembly and a given number of ampere turns of the biasing head 18, the distance *d* should be kept at a minimum value for the attainment of optimum performance of the tape accompanied by a minimum of distortion of the signals being recorded. The distance *d* varies also in dependence upon the gap width 12 and is advantageously adjusted by experiment, that is, by determining the optimum performance of the recorder.

Once the distance *d* has been set, the tape outlet angle $\alpha$, FIG. 3, must be determined. This is also best done by a trial and error method similar to the determination of the distance *d*. As a practical example, the distance *d* and outlet angle $\alpha$ may be 0.5 millimeter and 30°, respectively. In this manner, the optimum reduced effective width *g*, FIG. 3, of the high frequency biasing field may be determined, the width *g* being less than the width G, FIG. 1, to thereby result in a reduction of the number of flux alternations effective on the tape 11 and, in turn, in a reduced high frequency fall-off effect of the recorder.

According to the invention, there is provided suitable control means for adjusting the biasing head 10 relative to the recording head 14, to maintain a constant spacing distance *d*, in the manner further described in the following.

Furthermore, in a head assembly according to the present invention and in contrast to conventional arrangements, the tape 11 is guided by the recording head with the magnetic layer of the tape being in sliding contact with the contour of said head, whereby the leading edge of the recording head is positioned at an optimum point within the biasing field.

Mere spacing of the heads 10 and 14, FIG. 3, while reducing the number of effective trailing biasing flux alternations, that is, reducing the effective field width G to a width *g* and in turn improving the high frequency response in the manner pointed out, has the disadvantage of weakening the biasing field strength effective upon the tape, thus requiring more ampere turns for the biasing magnet of a recorder of a given type or size.

Accordingly, a further feature of the invention, as shown by FIG. 4, consists in the heads 12 and 14 being arranged in as asymmetrical relative position, that is, with the gaps 12 and 19 being displaced both laterally and angularly, to effect a reduction of the number of trailing flux alternations effective on a point of the tape, substantially without decrease of the biasing field strength. In other words, with an offset or inclined mounting of the heads as shown in FIG. 4, the tape 11 passes through the trailing biasing field region 17*b* along a greatly shortened path in substantially the analogous manner as shown at 11*a* in FIG. 2.

More specifically, with further reference to FIG. 4, the biasing head 18 is at first shifted laterally relative to the recording head 10, that is, by displacing its axis *x*—*x* in parallel to the position *y*—*y* and in the direction opposite to the travelling direction of the tape 11, and the head 18 is then rotated about its center by an angle rearwardly or in the direction of said first direction, to assume a final position resulting in a substantial reduction of the length of the trailing magnetic field along the tape 11. In the example illustrated, with the dimensions of the gaps and the displacements being shown greatly exaggerated for better illustration, the axis of the gap 19 in the final position intersects the axis *x*—*x* of the gap 12 at a point coinciding approximately with the edge of the trailing pole of the gap 12. It can be seen that it is possible in this manner, by the proper adjustment of both the lateral and angular displacements of the head or magnet 18 relative to the head 10, to reduce the length of the effective trailing biasing field to a practically negligible value without reducing or weakening the leading portion of the field serving to bias the tape while crossing the recording gap 12.

Referring now to FIG. 5, the numeral 20 denotes a support or base plate of the head assembly which may be fixedly mounted upon the top of the recorder. Further mounted on the base 20 is a supporting plate 21 carrying an erase head of conventional design. The plate 21 further carries a pivotally mounted supporting plate or member 25 having a pivot 26 and movable in a horizontal plane. Mounted upon the member 25, through the intermediary of a fine adjusting mechanism 27, described in greater detail in reference to FIGS. 9 and 10, is the biashead 28. Numeral 29 denotes the recording head being fixedly mounted upon the base 20. Since the distance between the heads 28 and 29 is relatively small, distance *d* in FIG. 3 being shown to a greatly enlarged scale, both heads appear in the drawing as if they were in contact with one another through the magnetic tape 11. In order to adjust the distance *d* between the heads, a tension spring 30, FIGS. 5 and 6, connects the member 25 with an extension 33 of the base 20, whereby to resiliently urge the head 28 toward the head 29. Adjustable stop means consisting of a fine pitch screw 32 engages with its inward end a stationary stop or extension 33. As a consequence, turning of the screw 32 in one direction or the other causes the member 25 to rotate for the adjustment of the distance between the heads 28 and 29.

A simplified way to maintain a constant spacing distance between the heads 28 and 29 is shown in FIG. 7. According to this modification, a pair of spacing elements 34 and 35, consisting of a suitable slightly resilient material, such as hard rubber, and being affixed to one of the heads, is employed to limit the distance between the heads to a predetermined value. The space between the elements 34 and 35 may serve for the guiding of the tape 11, in the manner shown and understood.

Referring to the biasing head retracting mechanism of FIG. 8, when the control knob (not shown) is in the "STOP" position, a follower roller 47, disposed at the end of a lever 48 pivoted at 49, rides upon a cam 46 connected with the stem of said knob, whereby the opposite end of the lever 48 is in its lowermost position, i.e., with the biasing head 28 in the retracted or inoperative position, as shown in full lines in the drawing. Lever 48 is jointed to the carrier 25 of the biasing head 28 through a link 50. On the other hand, if the control knob is set to "PLAY" or "RECORD" positions, lever 48 is rotated by the cam 46, whereby the biasing head 28 is operated to its operative position, as indicated in dashed lines in the drawing.

The fine adjustment mounting 27 of the biasing head 28 is illustrated in greater detail by FIGS. 9 and 10. According to the latter, the pivotally mounted member 25 supports an angular member or bracket 40 and the biasing head 28 is adjustably mounted thereon by the aid of three adjusting screws 41, 42 and 43 arranged at the corners of a triangle and threadedly engaging said bracket. Disposed around each of the screws 41–43 is a compression spring 44 engaging the head 28, on the one hand, and the bracket 40, on the other hand. In use, setting of the pivot pin 45 determines the lateral displacement of the gaps of the heads 28 and 19. With the set screws properly adjusted, the pivot 45 engages the head 28, whereby to cause the axes of the gaps to be parallel, as shown at *x*—*x* and *y*—*y* in FIG. 4. Adjustment of the screw 42 then causes the head 28 to be offset or tilted by a suitable angle $\gamma$, FIG. 4, to thereby result in the final displaced and relatively offset position of the heads with a minimum of trailing biasing flux alternations *a* effecting the tape 11, in the manner and for the purpose understood from the foregoing.

In the foregoing, the invention has been described in reference to a specific illustrative device. It will be evident, however, that variations and modifications, as well as the substitution of equivalent parts or elements for those shown for illustration, may be made without departing from the broader scope and spirit of the invention as set forth in the appended claims. The specification and drawings are accordingly to be regarded in an illustrative rather than in a restrictive sense.

I claim:

1. A magnetic tape recorder comprising in combination:

(1) a low frequency recording magnet including a magnetic recording gap, (2) a recording tape arranged to move across said gap in contact with said magnet, and (3) a high-frequency biasing magnet having a biasing gap of relatively greater width than and spaced from said recording gap, said biasing magnet adapted to produce, upon excitation, a high-frequency biasing field having leading and trailing regions of predetermined length effective upon said tape ahead of and following, respectively, said recording gap in respect to the traveling direction of said tape, and said field having a frequency in relation to the tape speed, to cause a predetermined number of magnetic flux alternations to act upon said tape while passing through said field.

(4) said recording and biasing magnets spaced by a distance and arranged, in respect to an aligned position of said gaps, with the axis of said biasing gap displaced parallel in a direction opposite to the traveling direction of said tape and with said biasing magnet being rotated in the displacing direction, thereby to substantially reduce the length of the trailing region of said field effective upon said tape.

2. A magnetic tape recorder as claimed in claim 1, said magnets being relatively spaced and displaced, to reduce the length of the trailing biasing field effective on said tape to a value encompassing substantially a single flux alternation.

3. A magnetic tape recorder comprising in combination:

(1) a base, (2) a low-frequency recording magnet upon said base including a magnetic recording gap, (3) a recording tape arranged to move across said gap in contact with said magnet, (4) a movable support upon said base, (5) a high frequency biasing magnet upon said support including a magnetic biasing gap of relatively greater width than the width of said recording gap, (6) first adjusting means operative between said base and said support, to vary the spacing distance between said recording and biasing gaps, and (7) further multiple adjusting means operative between said support and said biasing magnet, to laterally and angularly displace, respectively, the axis of said biasing gap relative to the axis of said recording gap.

4. In a magnetic tape recorder as claimed in claim 3, said first adjusting means being comprised of a pivotal mounting of one end of said support upon said base with said biasing magnet disposed at the opposite end of said support, a nonmagnetic spacing member carried by and adjoining the gap of one of said magnets, and resilient means intervening between said support and said base, to urge said biasing magnet towards said recording magnet and into a position of engagement of said magnets through said spacing member.

5. In a magnetic tape recorder as claimed in claim 3, said first adjusting means being comprised of a pivotal mounting of one end of said support upon said base with said biasing magnet disposed at the opposite end of said support, resilient means intervening between said support and said base, to urge said support towards said recording magnet, and set screw means operatively engaging said support and said base, to adjust the spacing distance therebetween.

6. In a magnetic tape recorder as claimed in claim 3, including further adjusting means operative between said support and said base, to operate said biasing magnet from its operative position to a retracted position, and vice versa.

7. In a magnetic tape recorder as claimed in claim 3, said further adjusting means being comprised of a mounting plate upon said support, a plurality of adjustable set screws mounted in said plate with their ends engaging said biasing magnet, a compression spring encircling said screws intermediate said plate and said magnet, and a pivot pin having one end secured to said plate and having its opposite end operatively engaging said magnet.

References Cited

FOREIGN PATENTS

| | | |
|---|---|---|
| 925,318 | 3/1955 | Germany. |
| 1,032,565 | 6/1958 | Germany. |

BERNARD KONICK, *Primary Examiner.*

JEROME P. MULLINS, *Assistant Examiner.*